(12) United States Patent
Yamamoto et al.

(10) Patent No.: US 10,816,837 B2
(45) Date of Patent: Oct. 27, 2020

(54) DISPLAY DEVICE

(71) Applicant: Sony Corporation, Tokyo (JP)

(72) Inventors: Takeshi Yamamoto, Tokyo (JP); Soya Araki, Kanagawa (JP); Takao Sumida, Aichi (JP); Tomoyuki Yoshimatsu, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/329,349

(22) PCT Filed: Jul. 6, 2015

(86) PCT No.: PCT/JP2015/069441
§ 371 (c)(1),
(2) Date: Jan. 26, 2017

(87) PCT Pub. No.: WO2016/031394
PCT Pub. Date: Mar. 3, 2016

(65) Prior Publication Data
US 2017/0227806 A1   Aug. 10, 2017

(30) Foreign Application Priority Data
Aug. 28, 2014   (JP) .................. 2014-174200

(51) Int. Cl.
*G02F 1/1333* (2006.01)
*G02F 1/1335* (2006.01)
(Continued)

(52) U.S. Cl.
CPC ..... *G02F 1/133308* (2013.01); *G02B 6/0088* (2013.01); *G02F 1/133524* (2013.01);
(Continued)

(58) Field of Classification Search
CPC ........ G02F 2001/133317; G02F 2001/133628; G02F 1/133308; G02F 2001/13332;
(Continued)

(56) References Cited

U.S. PATENT DOCUMENTS 9,121,991 B2 *   9/2015   Mori .................... G02B 6/0088
10,281,645 B2 *  5/2019   Kong ................... G02B 6/0056
(Continued)

FOREIGN PATENT DOCUMENTS

CN   1716041 A     1/2006
CN   101681571 A   3/2010
(Continued)

OTHER PUBLICATIONS

Internatiional Search Report for PCT/JP2015/069441, dated Sep. 8, 2015, 3 pgs.
(Continued)

*Primary Examiner* — Jia X Pan
(74) *Attorney, Agent, or Firm* — Lerner, David, Littenberg, Krumholz & Mentlik, LLP

(57) ABSTRACT

A display device of the disclosure includes: a display panel; a decorative member that holds the display panel; and a light guide plate that has rigidity and includes an edge surface attached to the decorative member.

20 Claims, 6 Drawing Sheets

(51) Int. Cl.
*F21V 8/00* (2006.01)
*G02F 1/13357* (2006.01)

(52) U.S. Cl.
CPC .. *G02F 1/133536* (2013.01); *G02F 1/133553* (2013.01); *G02B 6/0085* (2013.01); *G02F 2001/13332* (2013.01); *G02F 2001/133314* (2013.01); *G02F 2001/133328* (2013.01); *G02F 2001/133628* (2013.01); *G02F 2201/54* (2013.01); *G02F 2202/28* (2013.01)

(58) Field of Classification Search
CPC ........ G02F 2001/133314; G02F 2001/133328; G02F 1/133524; G02F 2202/28; G02B 6/0085; G02B 6/0088; G02B 6/00; H01L 33/64
See application file for complete search history.

(56) References Cited

U.S. PATENT DOCUMENTS

| | | | |
|---|---|---|---|
| 2007/0058110 A1 | 3/2007 | Kajita et al. | |
| 2007/0222917 A1 | 9/2007 | Ono | |
| 2008/0303979 A1* | 12/2008 | Shimizu | F21V 7/05 349/65 |
| 2009/0185100 A1* | 7/2009 | Matsuhira | G02B 6/005 349/58 |
| 2010/0053936 A1* | 3/2010 | Kiyose | G02B 6/0091 362/97.1 |
| 2010/0066938 A1* | 3/2010 | Lee | G02B 6/0088 349/58 |
| 2010/0097746 A1 | 4/2010 | Toyoda et al. | |
| 2011/0292315 A1* | 12/2011 | Bae | G02B 6/0088 349/58 |
| 2012/0299809 A1 | 11/2012 | Fujii et al. | |
| 2013/0044508 A1* | 2/2013 | Bae | G02F 1/133615 362/602 |
| 2013/0236680 A1 | 9/2013 | Ahn et al. | |
| 2013/0263488 A1* | 10/2013 | Wu | G02B 6/0088 40/773 |
| 2014/0049720 A1* | 2/2014 | Kim | G02B 6/0088 349/58 |
| 2014/0071370 A1* | 3/2014 | Wang | G02B 6/0088 349/58 |
| 2014/0092631 A1 | 4/2014 | Fujii et al. | |
| 2015/0219954 A1* | 8/2015 | Kubo | G02F 1/133308 348/794 |
| 2015/0316811 A1* | 11/2015 | Uematsu | G02F 1/133308 349/58 |
| 2015/0362652 A1* | 12/2015 | Hayashi | G02B 6/005 362/607 |
| 2016/0282549 A1* | 9/2016 | Masuda | G02B 6/0085 |
| 2017/0269289 A1* | 9/2017 | Tsai | G02B 6/0088 |
| 2017/0363798 A1* | 12/2017 | Hirayama | G02B 6/0036 |

FOREIGN PATENT DOCUMENTS

| | | |
|---|---|---|
| CN | 103310708 A | 9/2013 |
| EP | 2133855 A1 | 12/2009 |
| EP | 2144218 A1 | 1/2010 |
| EP | 2717090 A1 | 4/2014 |
| EP | 3187927 A1 | 7/2017 |
| JP | H03243985 A | 10/1991 |
| JP | 11-84351 | 3/1999 |
| JP | 2007256518 A | 10/2007 |
| JP | 2008-304630 A | 12/2008 |
| JP | 2009277641 A | 11/2009 |
| JP | 2010217524 A | 9/2010 |
| JP | 2011034052 A | 2/2011 |
| JP | 2013037974 A | 2/2013 |
| JP | 2013186467 A | 9/2013 |
| JP | 2014112181 A | 6/2014 |
| KR | 20130102700 A | 9/2013 |
| WO | 2012111501 A1 | 8/2012 |
| WO | 2012161260 A1 | 11/2012 |
| WO | WO-2014115697 A1 * | 7/2014 ............. G02B 6/005 |

OTHER PUBLICATIONS

Extended European Search Report including Written Opinion for EP15835522.2 dated Jun. 18, 2018.
Partial Supplementary European Search Report for EP Application No. 15835522.2, dated Mar. 14, 2018.
Chinese Office Action including Search Report for CN2015800445741 dated Oct. 8, 2018.
Notice of Reasons for Refusal of Japanese Patent Application 2016545030 dated May 28, 2019.
Hongjin, LCD and Flat Panel Display Technology, Beijing University of Posts and Telecommunications Press, Jun. 30, 2007, 4 pages. (English abstract provided).
Hongjin, LCD and Flat Panel Display Technology, Beijing University of Posts and Telecommunications Press, Jun. 30, 2007, 4 pages.

* cited by examiner

[ FIG. 1 ]
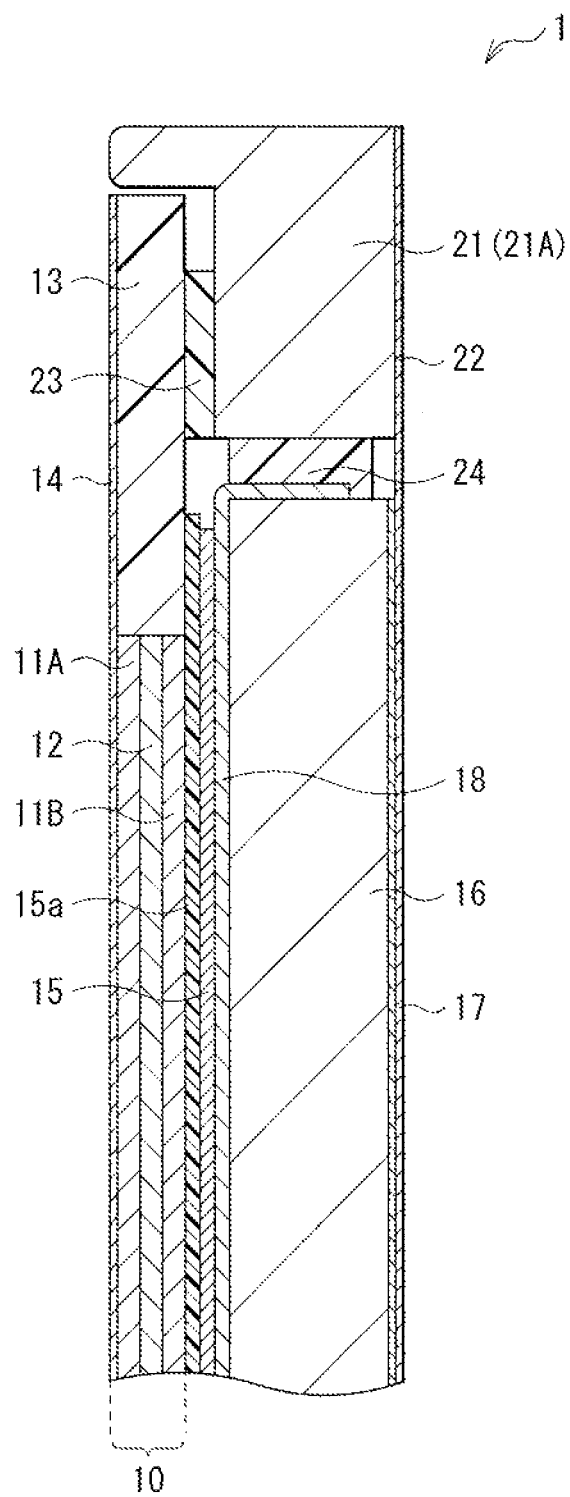

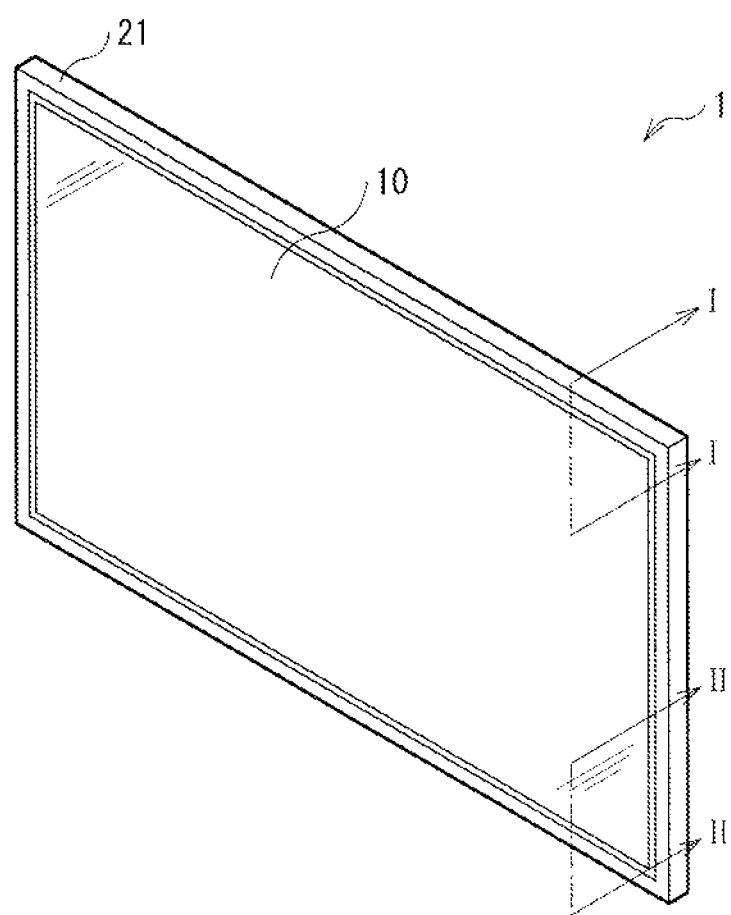
[FIG. 2A]

[ FIG. 2B ]
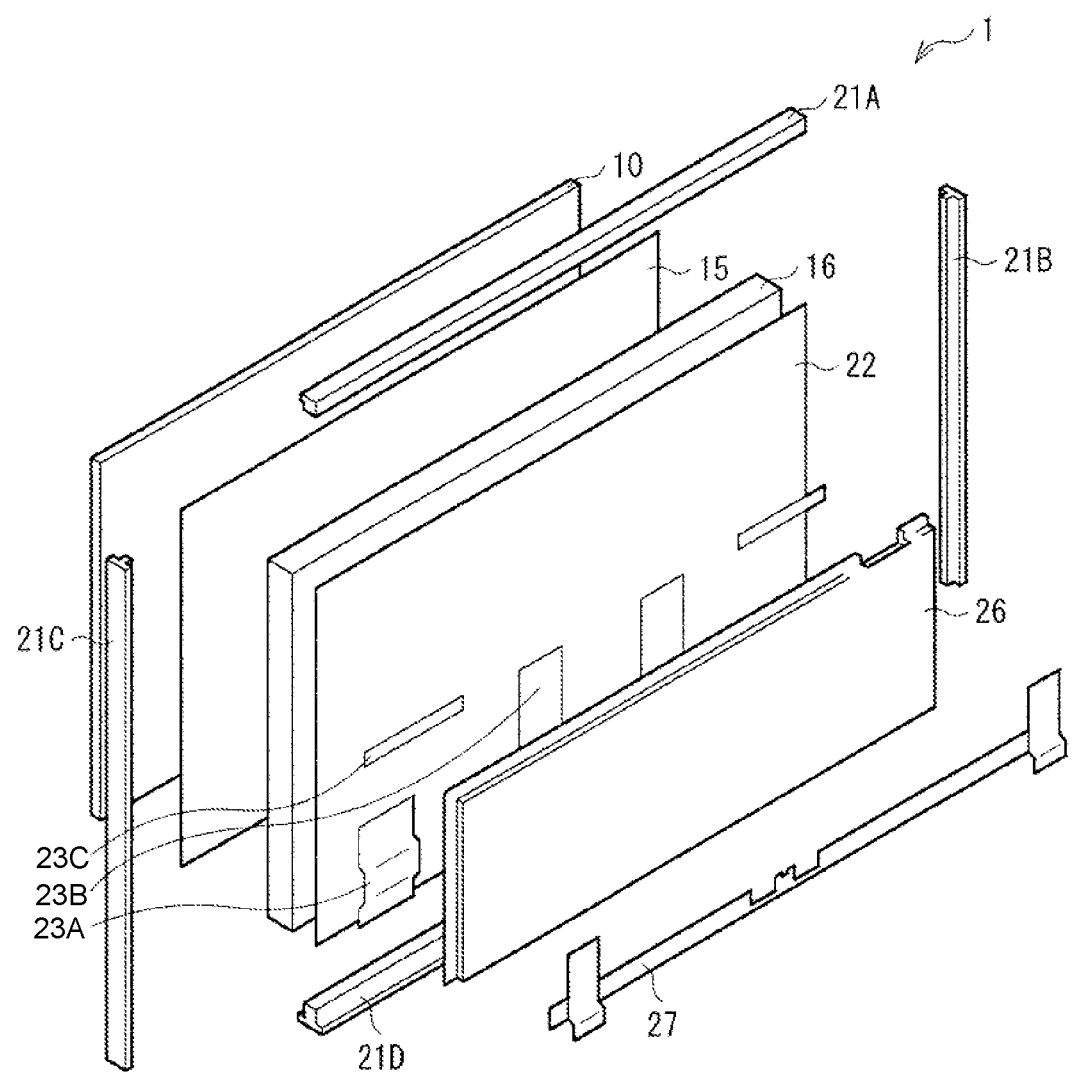

[FIG. 3]
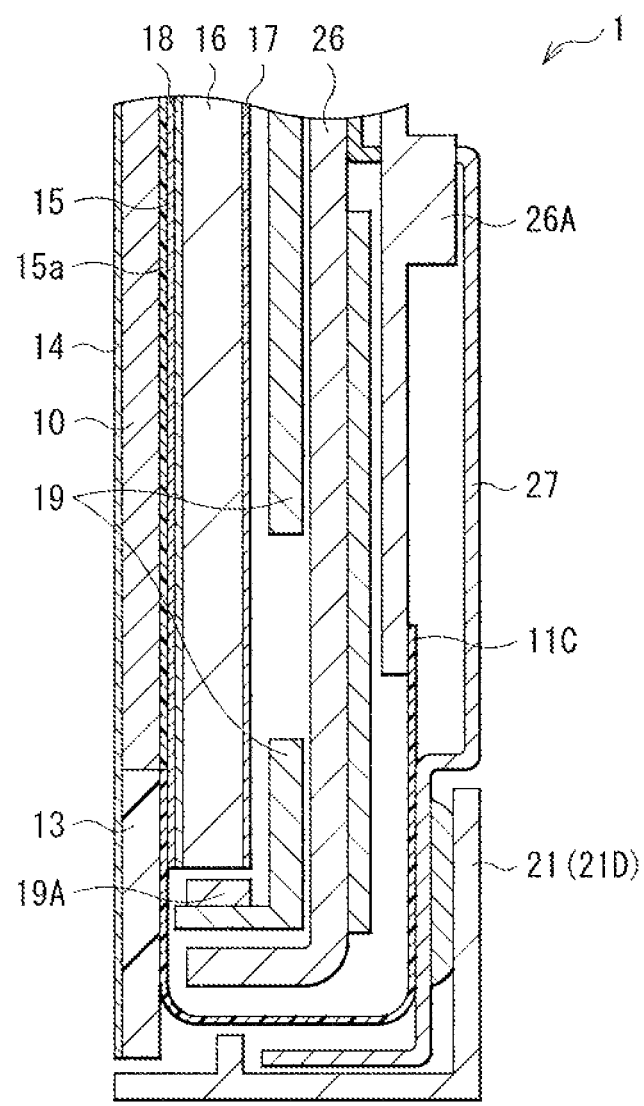

[FIG. 4A]
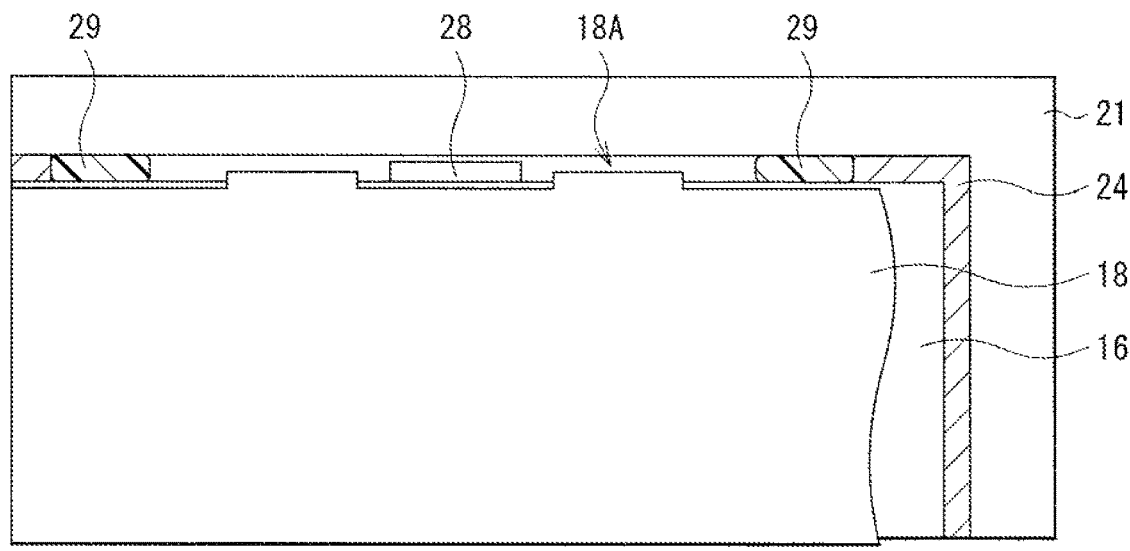
[FIG. 4B]
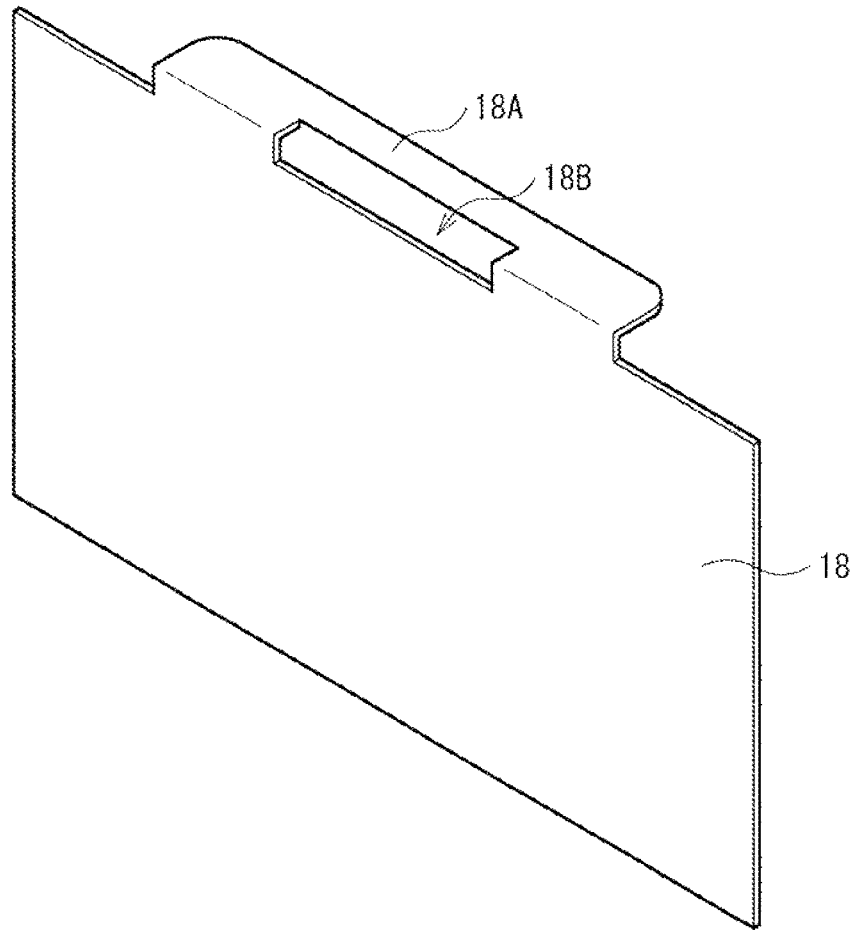

[FIG. 5]
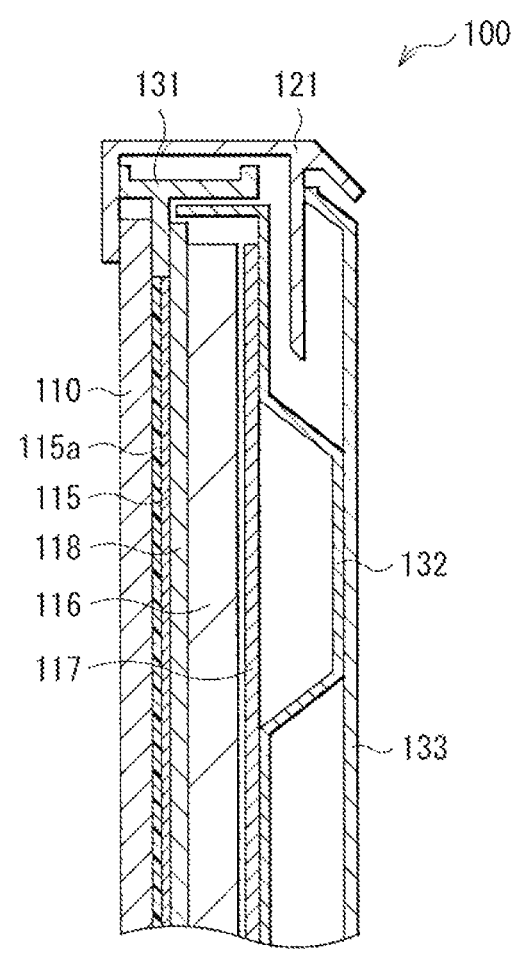
PRIOR ART

DISPLAY DEVICE

CROSS-REFERENCE TO RELATED APPLICATIONS

This application is a national phase entry under 35 U.S.C. § 371 of International Application No. PCT/JP2015/069441 filed Jul. 6, 2015, which claims the priority from Japanese Patent Application No. 2014-174200, filed in the Japanese Patent Office on Aug. 28, 2014, the entire contents which are hereby incorporated by reference.

TECHNICAL FIELD

The disclosure relates to a display device such as a television device.

BACKGROUND ART

In a display device typified by, for example, a liquid crystal display device, an organic EL display device, and an electrophoretic display device, there has been pursuit of a display device having a lower profile and a smaller weight. In a general display device, a display panel may be accommodated in a casing. The casing may include a front casing and a rear casing. The front casing may be disposed on display-surface side of the display panel, and include, for example, a front bezel and a top chassis. The rear casing may cover rear-surface side of the display panel, and include, for example, a back chassis, a frame, and a rear cover. (For example, reference is made to PTL 1.)

CITATION LIST

Patent Literature

[PTL 1] Japanese Unexamined Patent Application Publication No. 2008-304630

SUMMARY OF THE INVENTION

In recent years, in the display device such as the liquid crystal display device, advance in techniques of the display panel and electronic components has brought enhancement in designability of an external appearance. For purpose of further enhancement, there has been pursuit of the lower profile and a narrower frame border of the display device. However, in an existing display device, as disclosed in PTL 1 mentioned above, the casing that accommodates a liquid crystal panel may include a plurality of members. This constitutes hindrance to the enhancement in the designability such as the lower profile.

It is therefore desirable to provide a display device that makes it possible to reduce the number of components and to enhance designability.

A display device according to an embodiment of the disclosure includes a display panel, a decorative member, and a light guide plate. The decorative member holds the display panel. The light guide plate has rigidity and includes an edge surface attached to the decorative member.

In the display device according to the embodiment of the disclosure, the light guide plate includes a rigid member, and the edge surface of the light guide plate is attached to the decorative member. This leads to simplification of a component configuration.

According to the display device of the embodiment of the disclosure, the light guide plate includes a base having rigidity. The edge surface of the light guide plate is attached to the decorative member. Hence, it is possible to simplify the component configuration. To be specific, it is possible to simplify or eliminate a holder member and a rear member that hold the display panel and an optical member such as the light guide plate. In other words, it is possible to reduce the number of components and to enhance the designability. It is to be noted that some effects described here are not necessarily limitative, and any of other effects described herein may be achieved.

BRIEF DESCRIPTION OF DRAWINGS

FIG. 1 is a cross-sectional view of an upper part and its surroundings of a display device according to an embodiment of the disclosure.

FIG. 2A is a perspective view of an external appearance on front side of the display device illustrated in FIG. 1.

FIG. 2B is an exploded perspective view of the display device illustrated in FIG. 2, as viewed from rear.

FIG. 3 is a cross-sectional view of a lower part and its surroundings of the display device illustrated in FIG. 2.

FIG. 4A schematically illustrates an attachment part and its surroundings where a light guide plate of the display device illustrated in FIG. 2 is attached to a frame.

FIG. 4B is a perspective view of an optical sheet illustrated in FIG. 4.

FIG. 5 is a cross-sectional view of an upper part of a general display device.

MODES FOR CARRYING OUT THE INVENTION

Some embodiments of the disclosure are described in detail with reference to the drawings, in the following order.
1. Embodiment (an example in which a light guide plate is made of a material having rigidity, and an edge surface thereof is attached to a frame)
1.1 Overall Configuration
1.2 Description of Parts
1.3 Workings and Effects

1. Embodiment

[1.1 Overall Configuration]

FIG. 1 illustrates a cross-sectional configuration of an upper part and its surroundings of a display device (a display device 1) according to an embodiment of the disclosure. FIG. 2A illustrates, in perspective, an external appearance on front (display-surface) side of the display device 1. FIG. 2B illustrates, in perspective and in an exploded manner, an overall configuration of the display device 1, as viewed from rear side. FIG. 3 illustrates a cross-sectional configuration of a lower part and its surroundings of the display device 1. It is to be noted that FIGS. 1 and 3 are cross-sectional views respectively taken along lines I-I and II-II illustrated in FIG. 2. In FIG. 2B, the configuration is partially omitted. The display device 1 may be, for example, a liquid crystal display device used as a television device.

The display device 1 may include optical members, besides a display panel 10. Examples of the optical members may include a reflection polarizing film 15, a light guide plate 16, a reflection sheet 17, an optical sheet 18, and a light source 19A. In this embodiment, the light guide plate 16 may include a base having rigidity. Moreover, an edge surface of the light guide plate 16 is attached to a frame 21 (a decorative member). Hence, it is possible to eliminate or simplify chassis (e.g., a middle chassis 131, a back chassis 132, and a rear cover 133 (refer to FIG. 5)) that may be used as holder members in a general display device.

The display device 1 may include a sealing member 13 provided in a periphery of the display panel 10. The sealing member 13 may include a front surface that is level with the front surface (the display surface) of the display panel 10 (specifically, a CF substrate 11B). A bonding film 14 may be bonded to the display surface of the display panel 10 including the sealing member 13.

[1-2. Description of Parts]

The display panel 10 may display an image such as a moving image or a still image. The display panel 10 may include, for example, a TFT (Thin Film Transistor) substrate 11A (a first substrate), the color filter (CF) substrate 11B (a second substrate), and a display layer (here, a liquid crystal layer 12) provided between the two substrates. The display panel 10 may include polarizing plates (not illustrated) provided on opposite surfaces to the liquid crystal layer 12 of the TFT substrate 11A and the CF substrate 11B (on the front surface (the display surface) and the rear surface of the display panel 10). The polarizing plates may each transmit polarized light in a specific direction.

The TFT substrate 11A may include a glass substrate and a plurality of pixel electrodes (not illustrated) provided on the glass substrate. The plurality of pixel electrodes may be disposed, for example, in a matrix. The TFT substrate 11A may include TFT elements, gate lines and source lines, and other components (neither illustrated). The TFT elements may drive the plurality of respective pixel electrodes. The gate lines and the source lines may be coupled to the TFT elements. The pixel electrodes may be made of, for example, a conductive material having transparency, e.g., ITO (Indium Tin Oxide). The pixel electrodes may be provided on the glass substrate for respective subpixels (not illustrated).

The TFT substrate 11A may be, for example, a rectangular substrate. Here, although illustrated in a simplified manner, one side of the TFT substrate 11A may be longer than a corresponding side of the CF substrate 11B, so as to form an extension. The extension of the TFT substrate 11A may include an electrode. One end of a printed circuit substrate 11C may be electrically coupled to the electrode through an anisotropic conductive film (ACF).

The CF substrate 11B may include a glass substrate and a color filter (not illustrated) provided on the glass substrate. The color filter may include, for example, red (R), green (G), and blue (B) filters in stripes. The CF substrate 11B may also include an opposite electrode (not illustrated) over an entire surface of an effective display region on the color filter. The opposite electrode may be made of, for example, the conductive material having transparency, e.g., ITO, as with the pixel electrodes as mentioned above. It is to be noted a spacer may be provided between the opposite electrode and the pixel electrodes on side on which the TFT substrate 11A is disposed, although not illustrated here. The spacer may maintain a gap between both substrates.

The printed circuit substrate 11C may have flexibility. As described above, the printed circuit substrate 11C may include the one end that is electrically coupled, through the ACF, to the electrode provided in the extension of the TFT substrate 11A. The printed circuit substrate 11C may include another end that is electrically coupled to a driver substrate 26A. The driver substrate 26A may be mounted on a back chassis 26 disposed on the rear side of the display panel 10.

The liquid crystal layer 12 may include, for example, a liquid crystal material (liquid crystal molecules) having negative dielectric anisotropy, in a case of a normally black system. Examples of the liquid crystal material having the negative dielectric anisotropy may include MLC-7026-000 (available from Merck KGaA). It is to be noted that the material used for the liquid crystal layer 12 is not limited thereto. For example, in a case of an IPS (In Plane Switching) mode, a liquid crystal material having positive dielectric anisotropy may be used. Moreover, the liquid crystal material having the positive dielectric anisotropy may be also used in a case of a normally white system such as a TN (Twisted Nematic) mode. It is to be noted that the liquid crystal layer 12 may be sealed by a sealing material (not illustrated). The sealing material may be provided, in a periphery of the liquid crystal layer 12, between the TFT substrate 11A and the CF substrate 11B. Moreover, alignment films (not illustrated) may be provided between the liquid crystal layer 12 and the TFT substrate 11A, and between the liquid crystal layer 12 and the CF substrate 11B. The alignment films may cause the liquid crystal molecules to be adjusted in a predetermined alignment state. As the alignment films, either vertical alignment films or horizontal alignment films may be used.

The sealing member 13 may be provided in the periphery of the display panel 10, as described above. This allows for planarization of a shouldered edge surface of the display panel 10 formed by combination of differently-sized members (i.e., the TFT substrate 11A and the CF substrate 11B).

For example, a general resin material may be used as the sealing member 13. In particular, in one preferable example, a photocurable resin may be used. Specific examples may include an acrylic resin, an epoxy resin, and a silicone resin. Among these, one preferable example may be a resin having small shrinkage after curing. In particular, the silicon resin may be suitable. The sealing member 13 may be colored. For example, coloring the sealing member 13 in black makes it possible to reduce light leakage through, for example, a side surface of the liquid crystal layer 12. Examples of a method of coloring the sealing member 13 may include adding a colorant, and using a resin material that changes color (is colored) by light irradiation in curing. In one preferable example, the colorant may be a material that maintains transmittance of the sealing resin material. Examples may include carbon black and a metal-containing dye.

It is to be noted that the sealing member 13 may be provided in an entirety of the periphery of the display panel 10, but this is non-limiting. For example, the sealing member 13 may be provided solely on one side of the rectangular-shaped display panel 10. In another alternative, the sealing member 13 may be provided in an interspaced manner on four sides of the display panel 10. The sealing member 13 may be provided in a pattern determined as necessary.

The bonding film 14 may be bonded to the front surface (the display surface) of the display panel 10 including the sealing member 13. The bonding film 14 may protect the front surface of the display panel 10, and provide unity of the display panel 10 and the sealing member 13. The bonding film 14 may be a film having transparency over its entire surface, or alternatively, a film that is partly colored in black in a peripheral part of the display region.

The reflection polarizing film 15 may transmit only polarized light or polarized wave in the specific direction, and cause reflection, toward the display panel 10, of light propagated through the light guide plate 16 from the light source 19A, without absorption of the light. The reflection polarizing film 15 may be attached to, for example, the TFT substrate 11A of the display panel 10, with an adhesive layer 15a in between.

The light guide plate 16 may propagate light entering from the light source 19A to guide the light toward the display panel 10. The light guide plate 16 may have a planar shape of, for example, a rectangle. In this embodiment, in one preferable example, the light guide plate 16 may be made of a material having high transparency and having rigidity. In a more preferable example, a material having a small coefficient of thermal expansion may be used. In one specific and preferable example, the light guide plate 16 may include a glass base. Any adjustment may be made with respect to a shape, a size, a refractive index, a concentration, or distribution of the concentration, or other factors, so that desired characteristics are obtained.

The reflection sheet 17 may prevent the light entering from the light source 19A from leaking through the light guide plate 16 to opposite side. The reflection sheet 17 may also cause efficient reflection, toward the display panel 10, of the light propagated through the light guide plate 16.

The optical sheet 18 may be a sheet that provides various optical functions with respect to light that is emitted from the light source 19A to irradiate the display panel 10 through the light guide plate 16. The optical sheet 18 may include a single layer of a sheet, or a stack of sheets. The sheet or the sheets may have, for example, a function of dividing the light entering the display panel 10 from the light source 19A through the light guide plate 16 into the entering light and a polarized component orthogonal to the entering light, a function of compensating a phase difference of light waves to provide wide viewing angle or to prevent coloration, or a function of diffusing display light.

A heatsink 19 may be disposed on a rear surface of the reflection sheet 17, and include, for example, a bending surface that wraps around a lower surface (a bottom surface) of the light guide plate 16. The light source 19A may be disposed on the bending surface. As the light source 19A, for example, a white LED (Light Emitting Diode) may be used. Alternatively, LEDs that provide red, green, and blue colors may be also used. Moreover, besides a point light source such as an LED, a line light source such as a fluorescent lamp may be also used. The light source 19A may be disposed, for example, directly on one edge surface (the lower surface) of the light guide plate 16. Alternatively, the light source 19A may be disposed along four sides of the light guide plate 16.

The parts that constitute the display device 1 as described above may be assembled as follows. In the display device 1, referring to FIGS. 2A and 2B, the display panel 10 may be disposed on a front surface of the display device 1. On side surfaces of the display panel 10, the frame 21 may be disposed. The frame 21 may serve as an exterior member of edge-surface parts of the display device 1, and fix the display panel 10 and the optical members as described above. On a rear surface of the display device 1, the rear sheet 22 may be bonded on rear-surface side of the light guide plate 16, with the reflection sheet 17 in between. The rear sheet 22 may serve as an exterior. Further, various kinds of metal plates 23A, 23B, and 23C, the back chassis 26 and a source shield 27, and other components may be attached near a lower part of the rear surface of the display device 1. The metal plates 23A, 23B, and 23C may serve as holding tools that allow for installation of the display device 1 on a stand or a wall, or other places. The back chassis 26 and the source shield 27 may be provided for mounting of the driver substrate 26A, and hold the driver substrate 26A. It is to be noted that these may be fixed in a stepped state to the light guide plate 16 so as to reduce contact area with the light guide plate 16, in order to prevent generation of stress due to a difference in the coefficients of thermal expansion between these and the light guide plate 16.

The frame 21 may be divided into four parts, as illustrated in FIG. 2B, namely a frame 21A, a frame 21B, a frame 21C, and a frame 21D. The frame 21A may cover a top surface. The frames 21B and 21C may cover lateral side surfaces. The frame 21D may cover a bottom surface. These may be combined to constitute the frame 21 in a frame shape. In one preferable example, the frame 21 may be made of, for example, a metal having high thermal conductivity. Specific and preferable examples may include aluminum (Al) in terms of costs and small weight. Besides, other materials may be also used, examples of which may include iron (Fe), polycarbonate (PC), and plastic in which an ABS resin is added to PC.

The display panel 10 may be attached to the frame 21, with an adhesive layer 23. The adhesive layer 23 may be provided on a rear surface of the sealing member 13 provided in the periphery of the display panel 10. In one preferable example, the adhesive layer 23 may be made of a soft resin material, in order to reduce stress applied to the display panel 10. For example, in one preferable example, a resin material of a closed-cell foam may be used. Using such a material makes it possible to absorb a difference in expansion and shrinkage of parts due to heat, and to prevent generation of display unevenness.

Moreover, the light guide plate 16 may be attached to the frame 21, with an adhesive layer 24 provided on edge surfaces of the light guide plate 16. In one preferable example, an UV resin material may be used as the adhesive layer 24. In this embodiment, referring to FIG. 4A, the light guide plate 16 and the frame 21 may be attached in an interspaced state by the adhesive layer 24. In the display device 1, the optical sheet 18 may not be bonded to the light guide plate 16. Instead, a part of the optical sheet may be disposed in a suspended state along the edge surface of the light guide plate 16. FIG. 4A schematically illustrates the suspended part and its surroundings of the optical sheet 18 along the light guide plate 16. FIG. 4B illustrates, in perspective, a shape of the surroundings of the suspended part of the optical sheet 18. The optical sheet 18 may include a lug (a tab 18A) as illustrated in FIG. 4B, at a predetermined position. The tab 18A may be turned out toward the light guide plate 16, and have a suspension hole 18B that extends across the turned-out part. The optical sheet 18 may be suspended by hooking the turned-out tab 18A over the edge surface of the light guide plate 16, and inserting a stopper 28 in the suspension hole 18B. In this way, it is possible to prevent the optical sheet 18 from being twisted due to the difference in the coefficients of thermal expansion between the light guide plate 16 and the optical sheet 18. Moreover, the adhesive layer 24 may include a dam material 29 at a position outward of the suspended part. The dam material 29 may prevent an adhesive from flowing into the suspended part and its surroundings, in order to prevent the optical sheet 18 from unintentionally being attached to the light guide plate 16 when light guide plate 16 is attached to the frame 21 with the adhesive layer 24. It is to be noted that the description here is given of an example of installation of the optical sheet 18 solely on a top side of the light guide plate 16, but this is non-limiting. For example, the lug as described above may be provided on all four sides of the optical sheet 16, so as to install the optical sheet 18 on all sides of the light guide plate 16.

The rear sheet 22 may keep external light from entering an inside of the display device 1, and adjust an external appearance of the rear surface of the display device 1. The rear sheet 22 may be made of, for example, a black-colored metal sheet such as aluminum (Al), and a resin film such as a black film that is mixed with a black colorant and has optical density of 1 or more.

As the back chassis 26 and the source shield 27, for example, a metal having high thermal conductivity, specifically aluminum (Al), may be used. In addition, iron (Fe), polycarbonate (PC), or plastic with an ABS resin added thereto may be also used. It is to be noted that the use of the metal material makes it possible to shield an electromagnetic wave generated from various circuits and electronic components. This leads to reduction in unwanted radiation generated from various circuits and electronic components provided in the inside of the display device 1.

The display device 1 may provide picture display by application of a drive voltage between the TFT substrate 11A and the CF substrate 11B. In one specific example, the application of the drive voltage may cause a change in the alignment state of the liquid crystal molecules included in the liquid crystal layer 12, in response to an electric potential difference between the TFT substrate 11A and the CF substrate 11B. Regarding the alignment state of the liquid crystal molecules, in a case with use of the vertical alignment films in the normally black system, the liquid crystal molecules may make a response so as to change their attitude from vertical inclination (at a right angle) to horizontal inclination (in parallel) with respect to the TFT substrate 11A and the CF substrate 11B. In contrast, in the normally white system such as the TN mode, the liquid crystal molecules may make a response so as to change their attitude from the horizontal inclination (in parallel) to the vertical inclination (at the right angle) with respect to the TFT substrate 11A and the CF substrate 11B. In this way, the change in optical characteristics of the liquid crystal layer 12 may cause entering light to be modulated by the liquid crystal molecules to become emission light. The entering light refers to light emitted from the light source 19A and entering the liquid crystal layer 12 through the light guide plate 16. Gradation expression may be made on the basis of the emission light, to provide the picture display.

FIG. 5 illustrates a cross-sectional configuration near a top surface of a general display device 100. In the display device 100, a light guide plate 116 may be made of, for example, a resin material such as an acrylic resin. The light guide plate 116 made of, for example, an acrylic resin has small rigidity. Accordingly, optical members such as the light guide plate 116, a reflection sheet 117, and an optical sheet 118 may be held by holder members such as the middle chassis 131 and the back chassis 132. In one configuration example, the optical members and a display panel 110, and other components may be held by, for example, the middle chassis 131 and the back chassis 132, and may be accommodated in a casing. The casing may include a frame 121 and a rear cover 133 that cover a peripheral region (a frame border part) of the display panel 110 and side surfaces of the display panel and the optical members. It is to be noted that the display panel 110, the frame 121, the back chassis 132, and the rear cover 133 may each be fixed by screwing.

Thus, in the general display device 100, it is necessary to provide the holder members and the casing. The holder members may hold the display panel 110 and the optical members, and include, for example, the middle chassis 131 and the back chassis 132. The casing may accommodate them. Accordingly, it is difficult to reduce a thickness of the display device. Moreover, fixing the holder members and the casing with, for example, screws results in the large number of components, and large weight due to weight of the components.

In contrast, in the display device 1 of this embodiment, the light guide plate 16 may include the base having rigidity. The edge surface of the light guide plate 16 is attached and fixed to the frame 21. Accordingly, the reflection sheet 17 and the optical sheet 18 are held by the light guide plate 16. This allows for omission of the middle chassis 131, and simplification of the back chassis 132 so that the back chassis 132 is provided solely in a necessary part (here, a lower part of the rear surface on which the driver substrate 26A is mounted). Moreover, attaching the rear sheet 22 to the rear surface of the light guide plate 16 allows for elimination of the rear cover 133.

As described, in this embodiment, the light guide plate 16 may include the base having rigidity. The edge surface of the light guide plate 16 is attached to the frame 21. This allows for elimination of the holder members such as the middle chassis 131 and the back chassis 132, and the rear member such as the rear cover 133. Hence, it is possible to significantly reduce the number of components and to reduce weight in association therewith. Moreover, it is possible to provide the low-profile display device 1. In other words, it is possible to provide a higher degree of freedom in design of the display device 1, and enhance desinability of the external appearance of the display device 1.

Furthermore, in this embodiment, the display panel 10 may be fixed to the frame 21, with the adhesive layer 23 in between, on the rear surface of the sealing member 13 provided in the periphery of the display panel 10. This allows for elimination, from the frame 21, of a frame border part that covers the periphery of the display panel 10. In other words, it is possible to eliminate an overlap region in which a frame border part of the display panel 10 overlaps the frame border part of the frame 21. This leads to reduction in a frame border region.

Although description has been made by giving the embodiment as mentioned above, the contents of the technology are not limited to the above-mentioned example embodiments and may be modified in a variety of ways. For example, in the forgoing embodiment, the display device 1 is exemplified by the liquid crystal display device. However, the technology may be also applicable to a plasma display device or an organic electroluminescence display device.

Moreover, the members as described in the forgoing embodiment are exemplary. It is not necessary to provide all the members. Alternatively, another member or other members may be further provided.

It is to be noted that effects described herein are merely exemplified and not limitative, and effects of the disclosure may be other effects or may further include other effects.

It is to be noted that the technology may have configurations as follows.

(1) A display device, including:
  a display panel;
  a decorative member that holds the display panel; and
  a light guide plate that has rigidity and includes an edge surface attached to the decorative member.
(2) The display device according to (1), wherein the light guide plate is attached to the decorative member, with an adhesive layer in between.
(3) The display device according to (1) or (2), wherein the light guide plate includes a glass base.

(4) The display device according to any one of (1) to (3), further including an optical sheet provided on display-surface side with respect to the light guide plate, the optical sheet including a lug.
(5) The display device according to (4), wherein the adhesive layer is provided in a region other than the lug of the optical sheet.
(6) The display device according to any one of (1) to (5), further including a reflection polarizing film, wherein
the display panel includes a first substrate, a display layer, and a second substrate that are stacked in order, and
the reflection polarizing film is disposed on an opposite surface to the display layer of the first substrate.
(7) The display device according to any one of (1) to (6), wherein the display panel is attached to the decorative member, with an adhesive layer made of a soft resin material in between.
(8) The display device according to any one of (1) to (7), further including a sealing member provided in a periphery of the display panel, the sealing member including a surface that is level with a display surface of the display panel.
(9) The display device according to (8), further including a bonding film bonded to a front surface of the display panel and a front surface of the sealing member.
(10) The display device according to any one of (1) to (9), further including a rear sheet disposed on a rear surface of the light guide plate.

This application claims the priority on the basis of Japanese Patent Application No. 2014-174200 filed on Aug. 28, 2014 in Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display device, comprising:
a display panel;
a decorative member that holds the display panel;
a light guide plate that has rigidity and includes an edge surface attached to the decorative member, wherein the light guide plate and the decorative member are attached in an interspaced state by an adhesive layer having a plurality of interspaced portions extending from the edge surface of the light guide plate to a surface of the decorative member facing the edge surface of the light guide plate; and
an optical sheet disposed in a suspended state along the edge surface of the light guide plate, the optical sheet having a first member and a second member, the first member disposed directly on a first surface of the light guide plate that extends in a lengthwise direction of the light guide plate and the second member disposed directly on a second surface of the light plate that extends in a depthwise direction of the light guide plate so as to form a lug, the lug having an opening operable to dispose the optical sheet in the suspended state.

2. The display device according to claim 1, wherein the light guide plate includes a glass base.

3. The display device according to claim 1, wherein the optical sheet is provided on a display-surface side with respect to the light guide plate.

4. The display device according to claim 1, wherein the adhesive layer is provided in a region other than the lug of the optical sheet.

5. The display device according to claim 1, further comprising a reflection polarizing film, wherein
the display panel includes a first substrate, a display layer, and a second substrate that are stacked in order, and
the reflection polarizing film is disposed on an opposite surface to the display layer of the first substrate.

6. The display device according to claim 1, wherein the display panel is attached to the decorative member, with a second adhesive layer made of a soft resin material in between.

7. The display device according to claim 1, further comprising a rear sheet disposed on a rear surface of the light guide plate.

8. The display device according to claim 1, further comprising a heat sink with a bent surface that extends around a portion of a lower surface of the light guide plate wherein a light source is disposed on a first portion of the bent surface of the heat sink.

9. The display device according to claim 8, wherein the bent surface of the heat sink comprises a cornered surface having a second portion extending in a different direction than the first portion and along a lengthwise direction of the light guide plate.

10. The display device according to claim 8, wherein the heat sink is disposed on a rear surface of a reflection sheet and the reflection sheet is disposed on a rear surface of the light guide plate.

11. The display device according to claim 1, wherein the lengthwise direction of the light guide plate is orthogonal to the depthwise direction of the light guide plate.

12. The display device according to claim 1, further comprising a plurality of metal plates positioned along a rear surface of the display device, the plurality of metal plates allowing for support of the display device on an external surface.

13. The display device according to claim 12, wherein the plurality of metal plates are positioned internal to the display device between a rear surface of the light guide plate and a back chassis of the display device.

14. A display device comprising:
a display panel;
a decorative member that holds the display panel;
a light guide plate that has rigidity and includes an edge surface attached to the decorative member;
a sealing member provided in a periphery of the display panel, the sealing member including a surface that is level with a display surface of the display panel; and
an optical sheet disposed in a suspended state along the edge surface of the light guide plate, the optical sheet having a first member and a second member, the first member disposed directly on a first surface of the light guide plate that extends in a lengthwise direction of the light guide plate and the second member disposed directly on a second surface of the light plate that extends in a depthwise direction of the light guide plate so as to form a lug, the lug having an opening operable to dispose the optical sheet in the suspended state.

15. The display device according to claim 14, further comprising a bonding film bonded to a front surface of the display panel and a front surface of the sealing member.

16. The display device according to claim 14, further comprising a heat sink having a bent surface that extends around a portion of a lower surface of the light guide plate, wherein a light source is disposed on a first portion of the bent surface of the heat sink.

17. The display device according to claim 16, wherein the bent surface of the heat sink comprises a cornered surface having a second portion extending in a different than the first portion and along a lengthwise direction of the light guide plate.

18. The display device according to claim 14, further comprising a heat sink having a bent surface that extends around a portion of a lower surface of the light guide plate wherein the heat sink is disposed on a rear surface of a reflection sheet and the reflection sheet is disposed on a rear surface of the light guide plate.

19. The display device according to claim 14, wherein the lengthwise direction of the light guide plate is orthogonal to the depthwise direction of the light guide plate.

20. The display device according to claim 14, further comprising a plurality of metal plates positioned along a rear surface of the display device, the plurality of metal plates allowing for support of the display device on an external surface.

* * * * *